No. 642,465. Patented Jan. 30, 1900.
G. LANGER.
MOLDING AND COMPRESSING MACHINE.
(Application filed Mar. 18, 1898.)
(No Model.) 4 Sheets—Sheet 1.
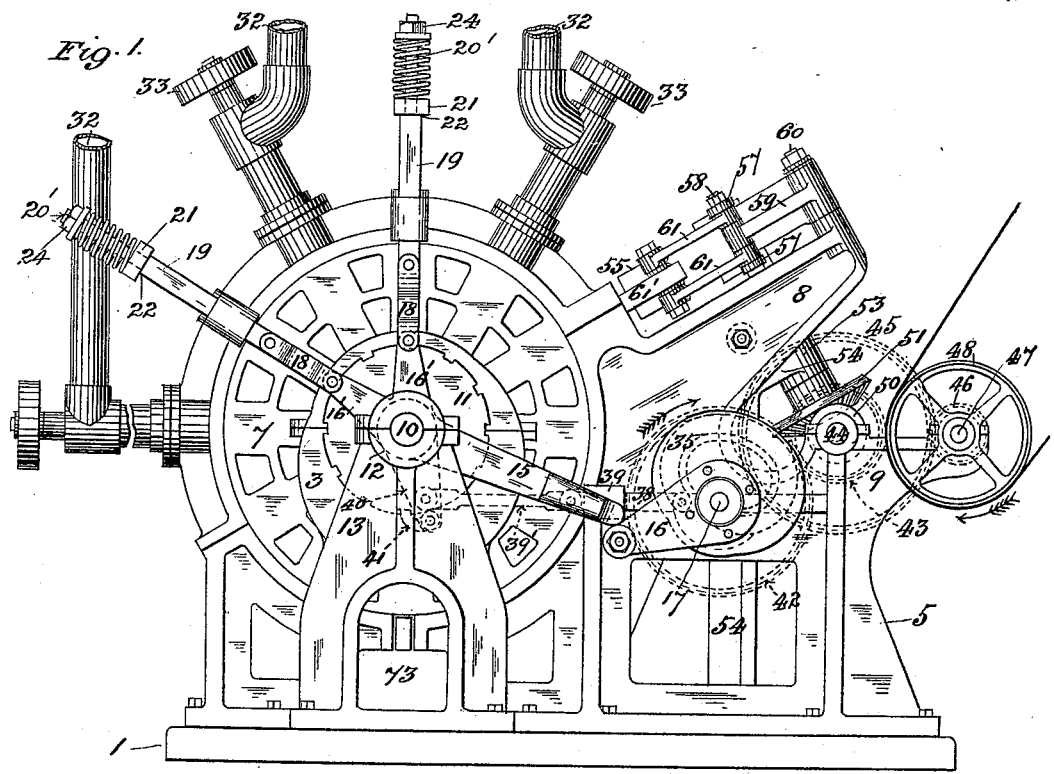
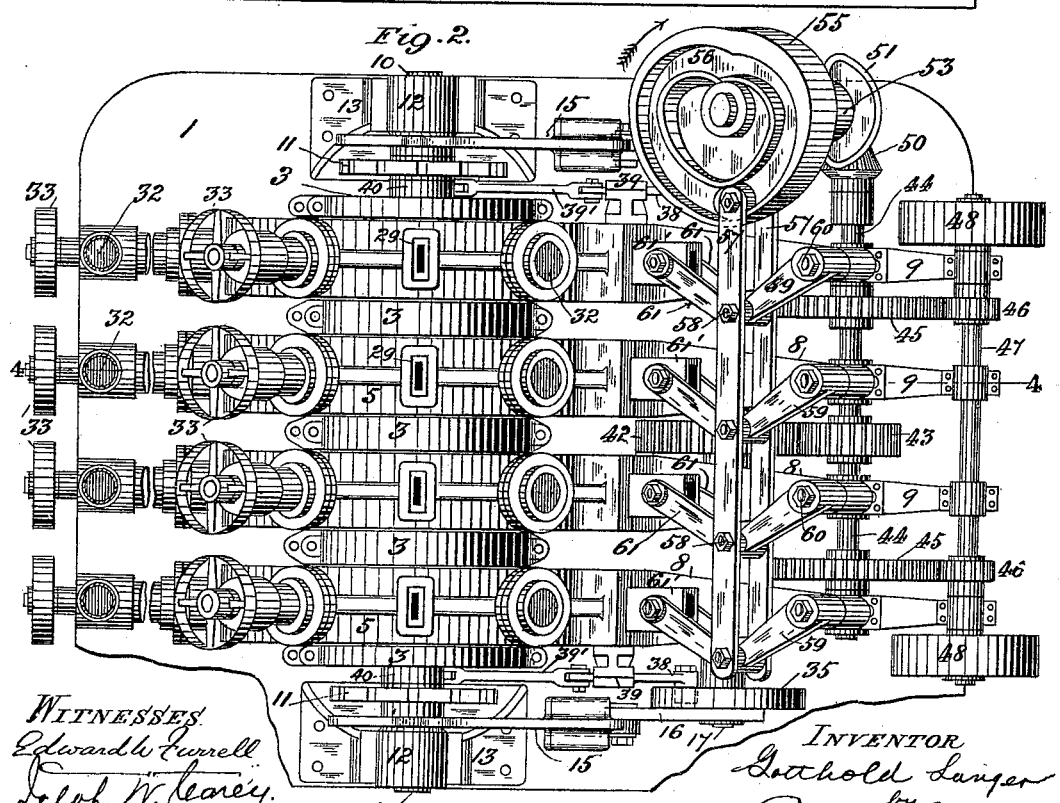

No. 642,465. Patented Jan. 30, 1900.
G. LANGER.
MOLDING AND COMPRESSING MACHINE.
(Application filed Mar. 18, 1898.)
(No Model.) 4 Sheets—Sheet 2.
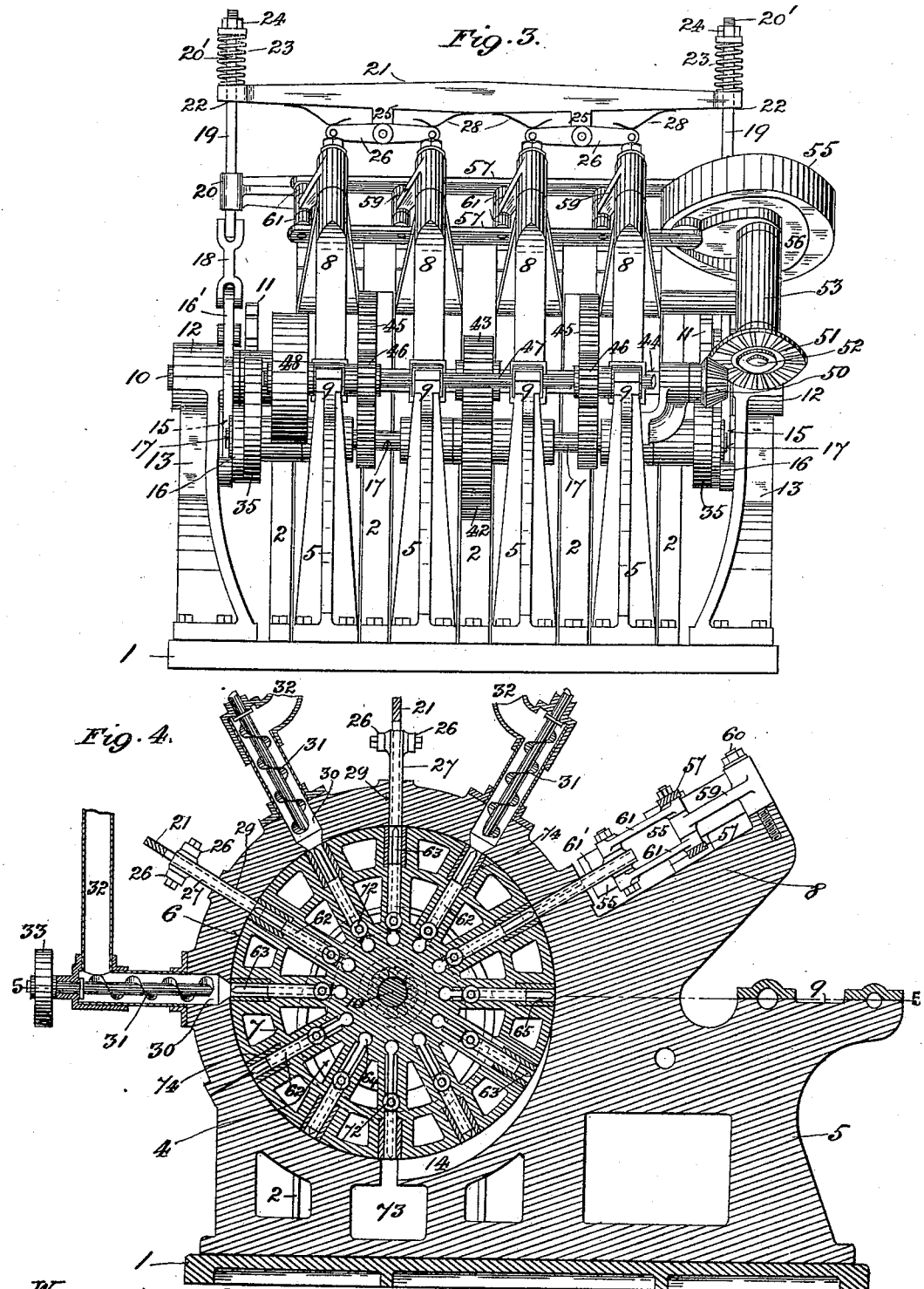

No. 642,465. Patented Jan. 30, 1900.
G. LANGER.
MOLDING AND COMPRESSING MACHINE.
(Application filed Mar. 18, 1898.)
(No Model.) 4 Sheets—Sheet 3.
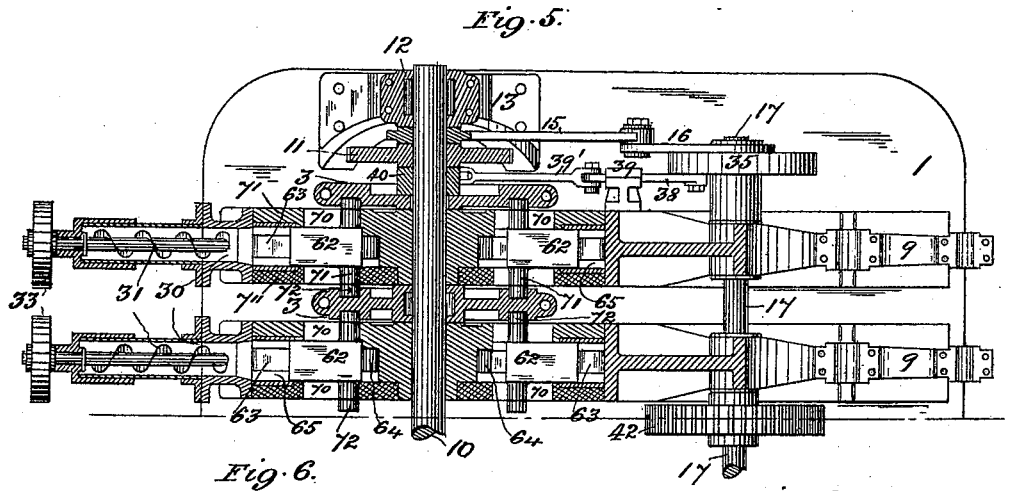
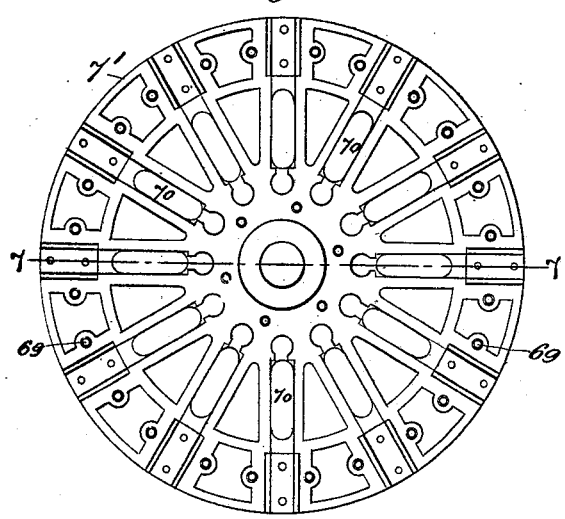
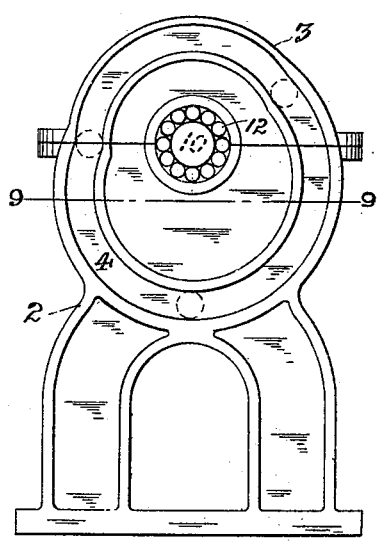
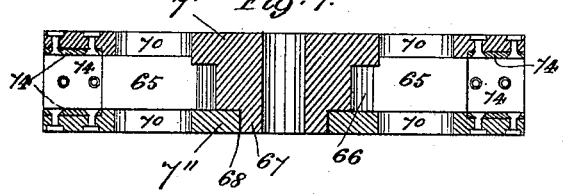
WITNESSES
Edward W. Purrell
Leah W. Leavy
INVENTOR
Gotthold Langer
by
Emil Storer, atty No. 642,465. Patented Jan. 30, 1900.
G. LANGER.
MOLDING AND COMPRESSING MACHINE.
(Application filed Mar. 18, 1898.)
(No Model.) 4 Sheets—Sheet 4.
Fig. 10.
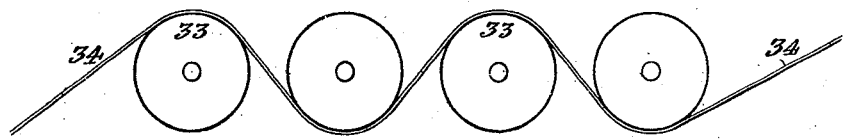
Fig. 11.
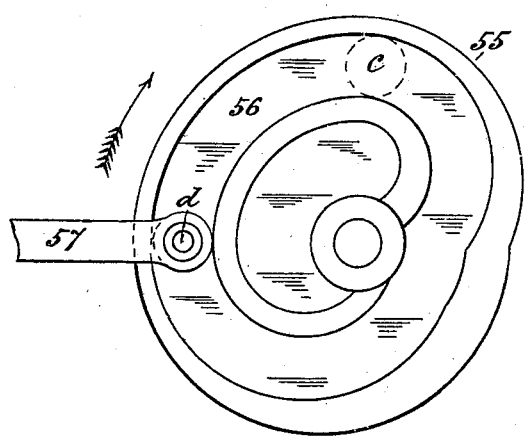
Fig. 12.
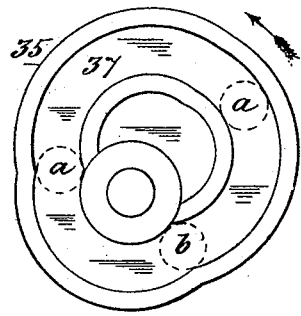
Fig. 14.
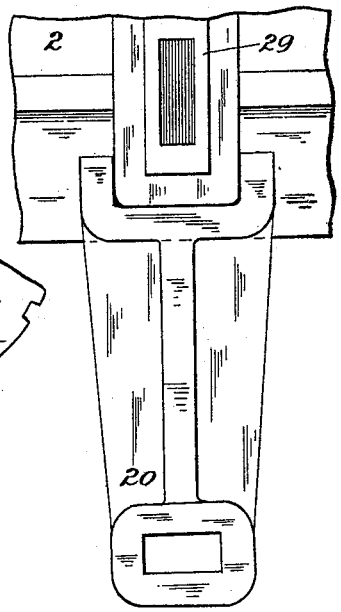
Fig. 13.
Fig. 15.
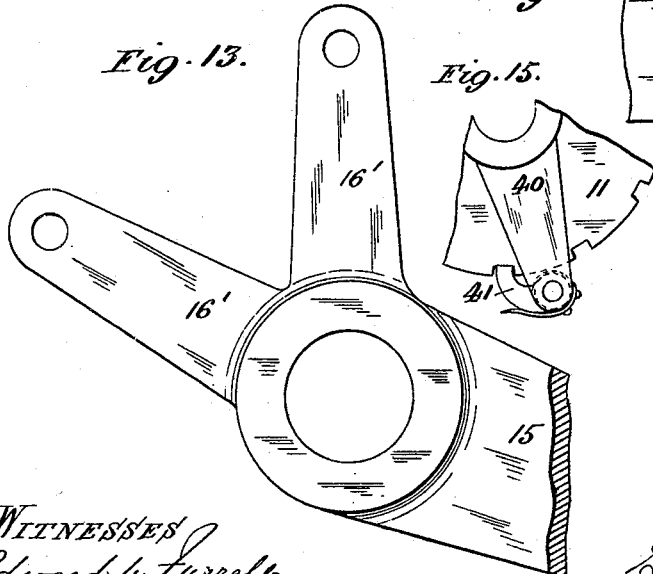
WITNESSES
Edward L. Farrell
Leloh W. Leavy
INVENTOR
Gotthold Langer
by
Emil Starex, atty

UNITED STATES PATENT OFFICE.

GOTTHOLD LANGER, OF ST. LOUIS, MISSOURI, ASSIGNOR TO JOSEPH C. MILLER, WILLIAM SCHWARZ, FRANK J. DAUSCHA, AND ANDREAS SENDLEIN, OF SAME PLACE.

MOLDING AND COMPRESSING MACHINE.

SPECIFICATION forming part of Letters Patent No. 642,465, dated January 30, 1900.

Application filed March 18, 1898. Serial No. 674,342. (No model.)

*To all whom it may concern:*

Be it known that I, GOTTHOLD LANGER, a citizen of the United States, residing at St. Louis, State of Missouri, have invented certain new and useful Improvements in Molding and Compressing Machines, of which the following is a full, clear, and exact description, reference being had to the accompanying drawings, forming a part thereof.

My invention has relation to improvements in molding and compressing machines; and it consists in the novel arrangement and combination of parts more fully set forth in the specification and pointed out in the claims.

In the drawings, Figure 1 is an end elevation of the machine. Fig. 2 is a top plan view with the packing-plungers and parts carrying and operating the same removed. Fig. 3 is a rear elevation of the machine. Fig. 4 is a section on line 4 4 of Fig. 2, taken through one of the mold-disks and the standard within which it is supported. Fig. 5 is middle horizontal section on line 5 5 of Fig. 4, only one-half of the machine being shown. Fig. 6 is a plan of the sectional mold-disk. Fig. 7 is a section on line 7 7 of Fig. 6. Fig. 8 is an elevation of one of the cam-plates and standard supporting the same. Fig. 9 is a section on line 9 9 of Fig. 8. Fig. 10 is a diagrammatic elevation of the pulleys operating the conveyers and the belt by which they are driven. Fig. 11 is a plan of the toggle-actuating cam-disk. Fig. 12 is a plan of the cam-disk of which the feed or advancing mechanism for the mold-disks is operated. Fig. 13 is a plan of the tripping-lever, partly broken away, by which are actuated the packing-plungers. Fig. 14 is a detail of one of the brackets through which operates the reciprocating rod or bar supporting the cross-bar from which the packing-plungers are suspended, this view showing the manner of securing the bracket about the outer ledge of the passage through which the plunger operates and Fig. 15 is a detail of the spring-actuated pawl by which the mold-disks are advanced.

The present invention relates to a class of machines designed for molding and compressing into blocks suitable composition for use as a fire-kindler, the particular object of the invention here described being to produce a machine which shall operate on a maximum number of blocks, one the product of which shall be uniform, one which is simple in construction, one producing blocks of great compactness, one which is positive in its action, and one possessing further and other advantages more fully set forth in the specification and pointed out in the claims. In detail it may be described as follows:

Referring to the drawings, 1 represents a suitable base, to which are secured a series of standards 2, each standard serving to support a cam-plate 3, (made, preferably, of two sections, the upper section being bolted to the lower half,) on the opposite faces of which are formed cam-tracks 4, serving, as hereinafter to be described, to constrain the movements of the female members of the series of dies carried by the mold-disks revolving adjacent to the cam-plates. Disposed on each side of the cam-plates and adjacent to the cam-tracks thereof are a series of standards 5, made, preferably, of two sections and provided each with a large central opening 6 for the reception of the mold-disks 7 and provided with the upper inclined brackets 8 and lower horizontal shaft-supporting arms or brackets 9. The several mold-disks 7 are keyed or otherwise secured to a common shaft 10, passing centrally and loosely through the series of cam-plates 3 and having secured at each end exteriorly to the outer cam-plate a peripherally-notched head or disk 11, the free end of said shaft being mounted on roller-bearings 12 at the top of the outer standards 13 and resting on corresponding bearings in the cam-plates.

The upper edge of the body portion of each standard 5 is substantially curved in the arc of a circle conforming approximately to the periphery of the mold-disk revolving within the opening 6 thereof, and the wall of each opening 6 is cut away in the shape of a recess 14 to permit the discharge of the blocks from the mold-disk, as subsequently to be explained. Loosely embracing each end of the mold-supporting shaft 10, between the terminal notched head 11 and the outer standard, is the hub portion of a weighted lever 15, the long arm of which when in its lowest or normal position is adapted to be tripped or tilted upwardly by the roller end of a crank-arm 16, secured at the end of an intermediate shaft 17, as more fully to presently appear. The weighted lever 15 is provided with a series (two in this case) of rearward extensions or short arms 16', each of which is pivotally connected to one end of a link 18, the opposite end of which is pivotally connected to the lower end of a reciprocating bar 19, passing loosely through a bracket 20, projecting outwardly and horizontally from each end of the frame of the machine. (By "frame" is herein designated any stationary portion of the machine.) The upper end of each bar 19 is provided with a reduced extension 20', over which is slipped a cross-bar 21, resting at each end on the shoulder 22, formed between the bar 19 proper and its extension, the upper surface of the cross-bar having bearing against it the lower end of a resilient coiled cushioning-spring 23, encircling the extension, and having its upper end bearing against a terminal nut 24, carried by the extension. Pivotally suspended from opposite sides of a depending lug 25, carried by the cross-bar on each side of the center thereof, and of a length to bring their opposite ends in substantial alinement with the molds of the mold-disks and the passages leading thereto, are beams 26, from between whose free ends are pivotally suspended the packing-plungers 27, which serve to pack the material as it is fed into the molds, as will presently more fully appear. The free ends of the beams are in contact with the free ends of the flexed equalizing-springs 28, whose fixed ends are secured to the cross-bar. The flexed springs yield to any disproportion of resistance which the packing-plungers may encounter, whereby the same resistance is substantially offered each plunger and no evil effects can result to the operating parts of the machine.

In the operation of the machine, as presently will appear, as the pockets of the mold-disks are successively advanced the weighted levers are tilted and rocked, as already indicated, thereby drawing down upon the cross-bar, compressing the cushioning-springs 23, and forcing the packing-plungers into the pockets of the mold-disk, the said plungers operating within the radially-disposed passages 29, formed in the outer walls of the standards within which the mold-disks revolve. As the lever-arms are released the springs 23 expand to their normal dimensions and the weighted levers 15 drop to their lowest positions, restoring the plungers to their normal position—that is, with their inner ends adjacent to the peripheries of the mold-disks and in readiness for the next operation.

Communicating with a series of radially-disposed passages 30, alternating with the passages 29, are spiral feed-conveyers 31, the blades of which are alternately right and left handed, the casings of the conveyers being supplied with the material to be compressed through pipes 32, leading upward to a suitable mixing-tank, (not shown,) the shafts of each alining series of conveyers being operated simultaneously from the belt-pulleys 33, set in motion by a belt 34, driven from any suitable source of power. (Not shown.) The lap of the belt passes alternately above and below the successive pulleys, (see Fig. 10,) thereby driving each pair simultaneously in opposite directions; but as the conveyers are right and left handed they will, under the circumstances, feed the material positively to the mold-disks.

Carried at each end of the shaft 17 and located interiorly to the crank-arm 16 is an eccentric or cam disk 35, provided along its inner face with a cam-track 37, along which travels the roller end of a reciprocating rod 38, loosely operating in a projecting bearing or bracket 39, the opposite end of the rod being pivotally secured to one end of a connecting-rod 39', whose farther end is pivotally connected to the free or rocking end of an arm 40, loosely embracing and rocking about the mold-carrying shaft 10. Adjacent to the juncture of the connecting-rod and arm is a spring-controlled pawl 41, adapted to engage the notches of the heads 11 and with each reciprocation of the rod (or, what is the equivalent thereof, with each revolution of the cam-disk) to advance the head 11 and mold-disks secured to the shaft 10 angularly a distance of one notch or the space between any two molds on the mold-disks measured along the periphery of the disk. It is obvious, of course, without special description that one revolution of the cam-disk will effect one reciprocation of the pawl, the length of the stroke being just sufficient to enable the pawl to seize the next notch of the notched head with each return stroke of said pawl and to advance it one notch with each forward stroke.

The shaft 17 is provided with a gear-wheel 42, meshing with a pinion 43, carried by a shaft 44, supported along the inner portions of the horizontal arms 9. Carried by the same shaft 44 on each side of the pinion 43 is a gear-wheel 45, meshing with pinions 46, carried by the main drive-shaft 47, mounted in bearings at the free ends of the arms 9. The main shaft is driven from the belt-pulleys 48, operated from any suitable source of power. (Not shown.) One end of the shaft 44 carries a bevel-pinion 50, meshing with a bevel gear-wheel 51 at the lower end of a spindle 52, mounted in the inclined tubular bearing 53 at the upper end of the standard 54, (omitted from Fig. 3 for the sake of clearness,) the gearing being so proportioned that for one revolution of the cam-disk 35 one revolution is imparted to the bevel gear-wheel 51 and to the cam-disk 55, carried at the upper end of the spindle thereof. The cam-disk 55 will be denominated as the "toggle-actuating cam-disk." This is provided along each face with cam-tracks 56, within each of which is designed to travel the roller end of a reciprocating bar 57, the bars being connected by pins 58, forming the joints of the toggle-levers, whose fixed members 59 are pivotally mounted about pins 60, projecting at right angles to the planes of the upper surfaces of the inclined brackets 8 and whose movable members 61 (located one on each side of the member 59) are pivotally secured at their free ends to the outer ends of the compressing-plungers 61', which coöperate with the female or movable portions 62 of the dies carried by the mold-disks.

The dies are each composed of a tubular movable or female portion 62, embracing the stationary or male portion 63, the latter having an outer tapering end and an inner substantially semicylindrical securing end 64, which is received at the base of the pocket 65 of the mold in a correspondingly-shaped depression or groove 66, disposed at right angles to the plane of rotation of the mold-disk, (see Fig. 7,) the end 64 being inserted endwise into the depression after the two sections of the die have been assembled—that is to say, after the female has been passed over the male portion. As best seen in detail in Figs. 6 and 7, each mold-disk is made of two sections 7' and 7", the former having formed therein the radially-disposed pockets 65 and being provided with a central collar 67, which is slipped into the opening 68 of the section 7" after the dies have been inserted into their pockets 65, the two sections when thus assembled being permanently coupled by the bolts 69, whereupon each pocket becomes inclosed on all sides except at the periphery of the disk. The several mold-disks are made light by the removal of a portion of the metal. Formed along the opposite faces of the mold-disk thus formed, or what constitute the terminal walls of the pockets when the sections of the mold-disk are assembled, are alining radially-disposed slots 70, through which project the outwardly-extending arms 71, carried by the end walls of the female portions 62, the free ends of said arms carrying rollers 72, which travel in the cam-tracks of the cam-plates 3.

It will be seen from the foregoing that as intermittent rotation is imparted from the main drive-shaft and intermediate gearing to the mold-supporting shaft, as already indicated, the female portions of the dies will be constrained to travel in the paths of the cam-tracks of the cam-plates 3, the degree of eccentricity of such cam-tracks determining the radial movement of the female members along their relatively fixed or stationary members, and consequently determining, in conjunction with the packing and compressing plungers, the solidity and compactness of the block compressed between the plungers and female portions and about the male portion. Of course the greater the number of packing-plungers the more solid will be the resulting block. It will be further apparent that the male portions of the dies about which the blocks are compressed determine the cross-section of the perforation or ventilating-opening of the resulting block.

It is of course obvious that while the packing-plungers and compressing-plungers are operating the several mold-disks and shaft along which they and the terminal notched heads 11 are mounted must remain at rest. This period of rest corresponds to the time that the roller end of the reciprocating rod 38 traverses that portion of the cam-track 37 of the disk 35 approximately defined between the limits $a\ a\ b$, Fig. 12, and corresponding to the time that the actuating-pawl 41 is being retracted from the notched head and the additional time it is at rest (while traversing $a\ b$) after being once retracted to begin the next advance of the said head. So, again, it is obvious that as the notched heads and mold-disks are being advanced (the period of advance corresponding to the travel of the roller end of the rod 38 between the limits $b\ a$) the several plungers must be at rest. This period of rest for the compressing-plungers corresponds to the time that the roller ends of the reciprocating toggle-operating bars 57 are traversing the concentric portion $c\ d$ of the cam-disks 55, (the toggle-levers being actuated while said roller ends are traversing the balance of said tracks,) and for the packing-plungers this period corresponds to the time while the weighted levers 15 are out of engagement with the roller ends of the revolving crank-arms 16. The conveyers of course are feeding constantly, so that as motion is imparted to the main drive-shaft 47 in the direction indicated by the arrow the parts described will be operated as indicated by arrows the hollow plungers coöperating with the female portions of the dies compressing the material within the pockets of the mold-disks about the male portions, the female portions by reason of the path they are constrained to follow in the tracks of the cam-plates eventually ejecting the compressed blocks into the recesses 14, the blocks eventually falling into a receptacle or space 73, whence they can be removed automatically in any suitable manner. (Not shown.) It is understood, of course, and best illustrated in Fig. 4 that the passages of the frame 5, through which the plungers operate and with which the pockets of the mold-disks communicate, are so spaced that they will always be in line of the axes of the pockets as the latter are successively advanced with the intermittent rotation of the mold-disks. The outer portion of each pocket, or that in which the compression of the block directly takes place, is primarily enlarged to admit of the introduction thereinto of suitable steel wearing-plates 74, thus prolonging the life of the mold-disks. The dotted positions of the inner ends of the plungers, Fig. 4, represent approximately the depth to which the plungers are forced into the pockets during the packing and compressing operations. It will be apparent, of course, that the capacity of the present machine can be increased by increasing the number in the series of cam-plates and mold-disks here shown.

The manner of securing the bracket 20 to the frame is best illustrated in Fig. 14, where the inner forked end of the bracket snugly embraces the walls of the projecting ledge surrounding the opening or passage through which the exterior packing-plunger operates.

Having described my invention, what I claim is—

1. In a press, a series of stationary cam-plates, a series of rotating mold-disks mounted adjacent to and between the said series of cam-plates, the latter having cam-tracks formed on each side or face of the plate, a series of radially-disposed pockets formed in the mold-disks, a die having a relatively stationary or male member and a movable or female member confined within each pocket, guide-arms carried by the movable member and operating within the cam-tracks formed in the cam-plates located adjacent to and on each side of the mold-disk, and suitable feeding devices for feeding the material to be compressed into the pockets of the mold-disks, substantially as set forth.

2. In a press, a suitable base, a series of standards, cam-plates mounted on said standards, a rotating shaft passing loosely through the center of each of said cam-plates, mold-disks keyed to said shaft and interposed between the cam-plates and in a position in proximity thereto, suitable radially-disposed pockets formed in the mold-disks, slots formed in the lateral walls of the pockets, a die composed of a male and female portion confined in each pocket, guide-arms carried by the female portion and projecting through said slots, beyond the outer faces of the walls in which the slots are formed the projecting ends of the arms being guided in the cam-tracks formed in the cam-plates, whereby the female members of the dies are constrained in their radial movement along the male members, a distance depending on the amount of eccentricity of the cam-tracks, suitable feeding devices for the pockets, and suitable plungers for compressing the material and operating in conjunction with the female portions of the dies, substantially as set forth.

3. In a press, a suitable mold-disk comprising a series of pockets disposed radially therethrough, one of the faces of the disk forming a permanent wall for the pockets, a detachable plate adapted to be secured to the opposite face of the disk and forming when secured thereto the opposite wall for said pockets, the two walls thus formed being provided with suitable radially-disposed alining slots, a nearly-cylindrical groove formed at the base of each pocket, the axis of the cylinder being disposed at right angles to the plane of rotation of the mold-disk, said cavity being adapted to receive the correspondingly-shaped fixed end of the stationary member of the die confined within the pocket, a movable or tubular portion embracing the male portion for a part of the length thereof, and having arms projecting through the radial slots referred to, the free end of the arms being adapted to travel along the cam-tracks formed in the cam-plates located adjacent to the mold-disks, substantially as set forth.

4. In a press, a series of supporting-standards, cam-plates carried thereby, a second series of standards, alternating with the first series, each standard of the second series having an opening formed therein for the reception of a revolving mold-disk, the walls of the opening embracing the major portion of the periphery of such disk, but being cut away near the base to permit the free discharge of the contents carried by the pockets of the disk, a basal receptacle communicating with the openings of the standards for the reception of the contents of the pockets of the several mold-disks, passages leading from the walls of the openings embracing the mold-disks, and being directed in lines radial with the circle of the disks and in substantial alinement with the axes of the pockets formed in the disk when such pockets are advanced to a position opposite the passages referred to, disks in said openings, pockets in said disks, suitable dies carried by the pockets of the disk, and suitable plungers coöperating with the dies and operating in the passages referred to whereby the material fed to the pockets is compressed, and subsequent to its compression is discharged and drops into the receptacle aforesaid, substantially as set forth.

5. In a press, one or more cam-plates, mold-disks operating in connection therewith, a series of radially-disposed pockets formed in each mold-disk, dies confined within the pockets, a series of plungers carried by the frame of the machine and operating in connection with the dies, means for intermittently advancing the series of pockets to the plungers, and simultaneously operating the dies, means for actuating the plungers after each advance of the mold-disk, the latter being held stationary during the action of the plungers, means for withdrawing the plungers and holding them stationary for the next succeeding advance of the mold-disks, the parts operating substantially as and for the purpose set forth.

6. In a press, a series of cam-plates, mold-disks rotating in proximity thereto and carrying dies controlled by the cam-tracks of said plates, a series of radially-disposed pockets for the reception of the dies, the pockets opening outward along the periphery of the disk, a shaft on which the mold-disks are supported, said shaft passing loosely through the series of cam-plates, plungers operating in connection with the dies carried by the pockets, toggle-levers for actuating the plungers, connecting-bars connecting the joints of the several toggle-levers, a toggle-actuating cam plate or disk having a track or groove along which one end of the connecting-bar travels and whereby reciprocation is imparted to the said bar and whereby the movable members of the toggles and the plungers connected thereto are actuated, a shaft for imparting rotation to the toggle-actuating cam-plate, suitable driving mechanism for said shaft, a second shaft actuated by the first shaft and rotated one revolution for every revolution of the toggle-actuating cam-plate, a cam-disk carried by said second shaft, peripherally-notched heads or plates keyed to the shaft carrying the mold-disks, and intermediate connections between the notched heads and the cam-disk of the second shaft for advancing the mold-disk angularly the distance between two consecutive pockets, and holding the mold-disks stationary during the action of the plungers, substantially as set forth.

7. In a press, a suitable rotating mold-disk, pockets carried thereby, suitable feeding mechanism for forcing the material to be compressed into the pockets, suitable packing-plungers for packing said material within the pockets, and suitable compressing-plungers for compressing the material into blocks, substantially as set forth.

8. In a press, a suitable rotating mold-disk, radially-disposed pockets carried thereby, feed-screws for feeding the material to be compressed into the pockets, spring-cushioned packing-plungers for packing the material thus fed, suitable compressing-plungers for compressing the material, and ejecting-dies for ejecting the blocks after compression, substantially as set forth.

9. In a press, a suitable frame, a series of mold-disks carried on a shaft mounted on the frame, a second shaft mounted in proximity to the first shaft, cam-disks carried thereby, intermediate connection between the cam-disks and the mold-disks for advancing the latter angularly, crank-arms secured at opposite ends of the shaft carrying the cam-disks, levers having hub portions loosely embracing the mold-carrying shaft, each lever having a long arm adapted to be struck and rocked by the crank-arm referred to, and one or more short arms, a link connected at one end to each short arm, the opposite end of each link being pivotally secured to one end of a spring-cushioned bar mounted upon the frame, beams pivotally suspended from the bar, springs for equalizing said beams, plungers suspended from the free ends of the beams, the said plungers being adapted to be forced into the pockets of the mold-disks with the rocking of the levers and consequent depression of the bars with each revolution of the crank-arms actuating and tilting the levers, substantially as set forth.

10. In a press, a suitable frame, a drive-shaft mounted on the same, pinions carried by said shaft, a second shaft mounted in proximity thereto and having gear-wheels meshing with the pinions, a bevel-pinion at one end of said second shaft, an inclined spindle having a bevel gear-wheel at one end meshing with said pinion, and at the opposite end a cam-disk, a pinion carried by the second shaft, a third shaft carrying a gear-wheel meshing with the pinion of the said second shaft, a cam-disk carried by the third shaft, a series of toggle-levers actuated by the rotation of the inclined cam-disks, a series of molds actuated upon the rotation of the cam-disk carried by the third shaft, the gearing being so proportioned that the two sets of cam-disks make one revolution in the same time and the cam-tracks being so defined and set that while the mold-disks are being advanced the toggle-levers are relatively at rest, and vice versa, and suitable plungers actuated by the toggle-levers, substantially as set forth.

11. In a press, a mold-disk having a nearly-cylindrical socket in each mold, a die comprising a male portion having a correspondingly-shaped securing end adapted to enter the socket of the mold-disk, and a female tubular portion embracing the same, an eccentric track, and arms carried by the female portion for traveling along said eccentric track during the rotation of the mold-disk, whereby the distance the female moves along the male is defined by the eccentricity of the track in which the arms travel, substantially as set forth.

In testimony whereof I affix my signature in presence of two witnesses.

GOTTHOLD LANGER.

Witnesses:
 EMIL STAREK,
 IELAH W. CAREY.